(12) United States Patent
Zhu et al.

(10) Patent No.: US 7,239,488 B2
(45) Date of Patent: Jul. 3, 2007

(54) MR SENSOR ON AN INSULATING SUBSTRATE AND METHOD OF MANUFACTURE

(75) Inventors: Li-Yan Zhu, San Jose, CA (US); Kazumasa Yasuda, Sunnyvale, CA (US); Cheng Yih Liu, San Jose, CA (US); Winston Jose, San Jose, CA (US)

(73) Assignee: SAE Magnetics (H.K.), Ltd., Shatin, N.T. (HK)

( * ) Notice: Subject to any disclaimer, the term of this patent is extended or adjusted under 35 U.S.C. 154(b) by 317 days.

(21) Appl. No.: 10/797,653

(22) Filed: Mar. 9, 2004

(65) Prior Publication Data
US 2005/0201019 A1 Sep. 15, 2005

(51) Int. Cl.
G11B 5/127 (2006.01)
G11B 21/21 (2006.01)
G11B 5/39 (2006.01)

(52) U.S. Cl. ............... 360/323; 360/235.3; 29/603.14

(58) Field of Classification Search ............... 360/317, 360/319, 322, 323, 235.3; 29/603.07, 603.13, 29/603.14
See application file for complete search history.

(56) References Cited

U.S. PATENT DOCUMENTS

| 5,653,013 | A * | 8/1997 | Gill et al. ............... 29/603.14 |
| 5,757,591 | A * | 5/1998 | Carr et al. ................ 360/323 |
| 5,805,390 | A * | 9/1998 | Takeura ................... 360/323 |
| 5,822,153 | A * | 10/1998 | Lairson et al. ........... 360/234.7 |
| 5,978,181 | A * | 11/1999 | Niijima et al. ............ 360/323 |
| 6,084,743 | A * | 7/2000 | Comstock et al. ........ 360/97.02 |
| 6,267,903 | B1 * | 7/2001 | Watanuki ................ 216/22 |
| 6,415,500 | B1 * | 7/2002 | Han et al. ............... 29/603.14 |
| 6,453,542 | B1 * | 9/2002 | Zhu ....................... 29/603.07 |
| 6,470,566 | B2 * | 10/2002 | Hsiao et al. ............ 29/603.13 |
| 6,633,459 | B2 * | 10/2003 | Heim et al. .............. 360/313 |
| 6,795,278 | B2 * | 9/2004 | Jarrett et al. ............. 360/323 |
| 6,995,958 | B2 * | 2/2006 | Zhu ....................... 360/323 |
| 7,042,683 | B1 * | 5/2006 | Cross et al. ............. 360/319 |
| 2001/0043446 | A1 * | 11/2001 | Barlow et al. ........... 360/319 |
| 2002/0085317 | A1 * | 7/2002 | Hoshino et al. .......... 360/320 |
| 2005/0146811 | A1 * | 7/2005 | Zhu ....................... 360/323 |

FOREIGN PATENT DOCUMENTS

| JP | 57198578 | A | * | 12/1982 |
| JP | 03248309 | A | * | 11/1991 |
| JP | 05073903 | A | * | 3/1993 |
| JP | 07073419 | A | * | 3/1995 |

(Continued)

*Primary Examiner*—William J Klimowicz
(74) *Attorney, Agent, or Firm*—Kenyon & Kenyon LLP

(57) ABSTRACT

According to an embodiment of the present invention, a slider design is presented that provides improved protection for the head/sensor of the slider. In one embodiment, the design of the slider is such that ESD protection is provided during the slider wafer process, the "back-end" processes (e.g., when the completed slider/head is incorporated into an HGA), and during operation in a disk drive or the like. In this embodiment, a conductive film is provided that surrounds the insulating-material slider substrate. The conductive film provides a grounding path during the wafer fabrication processes. This conductive layer may be further patterned during head fabrication to provide a ground path for back-end fabrication processes. A conductive stripe may be added for discharging debris in the slider-to-disk interface.

16 Claims, 8 Drawing Sheets

FOREIGN PATENT DOCUMENTS

| | | | | |
|---|---|---|---|---|
| JP | 08167123 A | * | 6/1996 |
| JP | 10091922 A | * | 4/1998 |
| JP | 11120518 A | * | 4/1999 |
| JP | 2000048326 A | * | 2/2000 |
| JP | 2000113417 A | * | 4/2000 |
| JP | 2000311316 A | * | 11/2000 |
| JP | 2001056912 A | * | 2/2001 |
| JP | 2001250207 A | * | 9/2001 |
| JP | 2001307309 A | * | 11/2001 |
| JP | 2002100009 A | * | 4/2002 |
| JP | 2002269706 A | * | 9/2002 |
| JP | 2002358608 A | * | 12/2002 |
| JP | 2002358609 A | * | 12/2002 |

* cited by examiner

MR SENSOR ON AN INSULATING SUBSTRATE AND METHOD OF MANUFACTURE

FIELD OF THE INVENTION

The present invention pertains to a method and apparatus for processing slider devices for hard disk drives and the like. More particularly, the present invention pertains to providing a grounding path to protect data circuitry in a magnetic recording device, especially for GMR-type heads.

BACKGROUND OF THE INVENTION

Hard disk drives are common information storage devices essentially consisting of a series of rotatable disks that are accessed by magnetic reading and writing elements. These data transferring elements, commonly known as transducers, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the disk data tracks. The high speed rotation of a magnetic disk generates a stream of air flow or wind along its surface in a direction substantially parallel to the tangential velocity of the disk. The air flow cooperates with the ABS of the slider body which enables the slider to fly above the spinning disk. In effect, the suspended slider is physically separated from the disk surface through this self-actuating air bearing. The ABS of a slider is generally configured on the slider surface facing the rotating disk, and greatly influences its ability to fly over the disk under various conditions.

As shown in FIG. 1 an ABS design known for a common catamaran slider 5 may be formed with a pair of parallel rails 2 and 4 that extend along the outer edges of the slider surface facing the disk. Other ABS configurations including three or more additional rails, with various surface areas and geometries, have also been developed. The two rails 2 and 4 typically run along at least a portion of the slider body length from the leading edge 6 to the trailing edge 8. The leading edge 6 is defined as the edge of the slider that the rotating disk passes before running the length of the slider 5 towards a trailing edge 8. As shown, the leading edge 6 may be tapered despite the large undesirable tolerance typically associated with this machining process. The transducer or magnetic element 7 is typically mounted at some location along the trailing edge 8 of the slider as shown in FIG. 1. The rails 2 and 4 form an air bearing surface on which the slider flies, and provide the necessary lift upon contact with the air flow created by the spinning disk. As the disk rotates, the generated wind or air flow runs along underneath, and in between, the catamaran slider rails 2 and 4. As the air flow passes beneath the rails 2 and 4, the air pressure between the rails and the disk increases thereby providing positive pressurization and lift. Catamaran sliders generally create a sufficient amount of lift, or positive load force, to cause the slider to fly at appropriate heights above the rotating disk. In the absence of the rails 2 and 4, the large surface area of the slider body 5 would produce an excessively large air bearing surface area In general, as the air bearing surface area increases, the amount of lift created is also increased.

As illustrated in FIG. 2, a head gimbal assembly 40 often provides the slider with multiple degrees of freedom such as vertical spacing, or pitch angle and roll angle which describe the flying height of the slider. As shown in FIG. 2, a suspension 74 holds the HGA 40 over the moving disk 76 (having edge 70) and moving in the direction indicated by arrow 80. In operation of the disk drive shown in FIG. 2, an actuator 72 moves the HGA over various diameters of the disk 76 (e.g., inner diameter (ID), middle diameter (MD) and outer diameter (OD)) over arc 78.

Giant Magnetoresistive (GMR) heads are being used more and more for advanced hard disk drives (e.g., capable of storing more than 80 gigabytes of data). GMR heads, which are well-known in the art, include components generally located in the middle of the trailing portion of the slider (not the air bearing surface of the slider). The GMR read sensor (for sensing data signals in the medium) tends to be susceptible to damage by electrostatic discharge (ESD). The write circuitry for the head typically includes an inductive coil (to create data signals in the medium) that are usually resilient against ESD damage.

The slider, as described above, is typically made of a ceramic such as $Al_2O_3TiC$, which is conductive. As the slider flies over the disk, the potential for the slider can be affected by triboelectric charge. Since the slider is conductive, this potential can be controlled by either grounding the slider or capacitive suppression (e.g., as described below).

Grounding of a slider may be accomplished, for example, by electrically coupling it to the conductive material of the slider suspension (e.g., stainless steel). On the other hand, if the connection between the slider substrate and the suspension is not sufficiently conductive, and the capacitance between them is appreciably larger than the capacitance of the slider-disk interface, then capacitive suppression is achieved.

In controlling the potential of the slider, grounding of the slider is more effective than capacitive suppression. In addition to coupling the slider, electrically, to the stainless steel suspension, the slider may also be provided with an extra conductive pad. In such a situation, a conductive trace would be provided on the suspension to connect the extra pad to ground.

Alternative to conductive sliders, a slider made of insulating material may be provided. For example, a slider made of alumina ($Al_2O_3$) may have superior mechanical properties (e.g., machining and reliability). However, a slider made only of insulating material poses serious ESD risks for the GMR sensor. First, when fabricating the sensor during wafer processes, the magnetic head cannot be discharged safely, which could damage the sensor. Second, during the manufacture of the head gimbal assembly (HGA), the slider substrate cannot be properly grounded. Third, debris in the slider to disk interface causes triboelectric charge (tribocharge) to build up. The resulting increased potential may exceed acceptable thresholds may damage the GMR head.

Therefore, insulating substrate has only been used with inductive recording heads, which are more resistant to ESD damage. U.S. Pat. No. 6,597,543 mentions an "insulating substrate" for MR read-heads. However the "insulating substrate" refers to a conventional $Al_2O_3TiC$ substrate, which is a well-known conductor, covered by a thin layer of alumina, known as the "under-coat." The application of this under-coat is also conventional practice. It simply insulates the GMR head from the conductive substrate. It does not render the $Al_2O_3TiC$ substrate an insulating substance. U.S. Pat. Nos. 5,757,591 and 6,607,923 describe a sapphire wafer substrate which is truly insulating. A pair of build-in diodes is employed to reduce the risk of ESD damage. However, the diodes will not prevent ESD damage in case of dielectric breakdown (i.e., arcing) between the shield and the GMR stripe.

Referring to U.S. Pat. No. 6,453,542, shields are provided to protect the GMR head from ESD arcing. The shields are conductively connected to the GMR sensor. If the shields, however, receive a fast transient current (e.g., caused from passing debris at the slider to disk interface), the potential in the shield may be so large that arcing may occur between the shield and the sensor causing ESD damage.

In order to minimize fast transient current entering the shield, a prior-art solution is to ground the conductive slider substrate, so that passing debris can be discharged by the slider substrate as it approaches the shields. Obviously this solution is not applicable with an insulating slider substrate. In theory, a conductive coating may be applied to the slider substrate, to render the air-bearing surface (ABS) conductive. However to achieve high recording density, such a coating must be extremely thin (in the order of one nanometer). It is very difficult to achieve desired conductivity with such a thin coat. Furthermore, the coating will be subject to wear.

In view of the above, there is a need for an head/slider design that improves the protection for head/sensor damage due to ESD and the like.

SUMMARY OF THE INVENTION

According to an embodiment of the present invention, a slider design is presented that provides improved protection for the head/sensor of the slider. In one embodiment, the design of the slider is such that ESD protection is provided during the slider wafer process, the "back-end" processes (e.g., when the completed slider/head is incorporated into an HGA), and during operation in a disk drive or the like. In this embodiment, a conductive film is provided that surrounds the insulating-material slider substrate. The conductive film provides a grounding path during the wafer fabrication processes. This conductive layer may be further patterned during head fabrication to provide a ground path for back-end fabrication processes. This patterned conductive layer may further constitute a conductive stripe at the ABS for discharging debris in the slider-to-disk interface.

DETAILED DESCRIPTION

Figure 1:
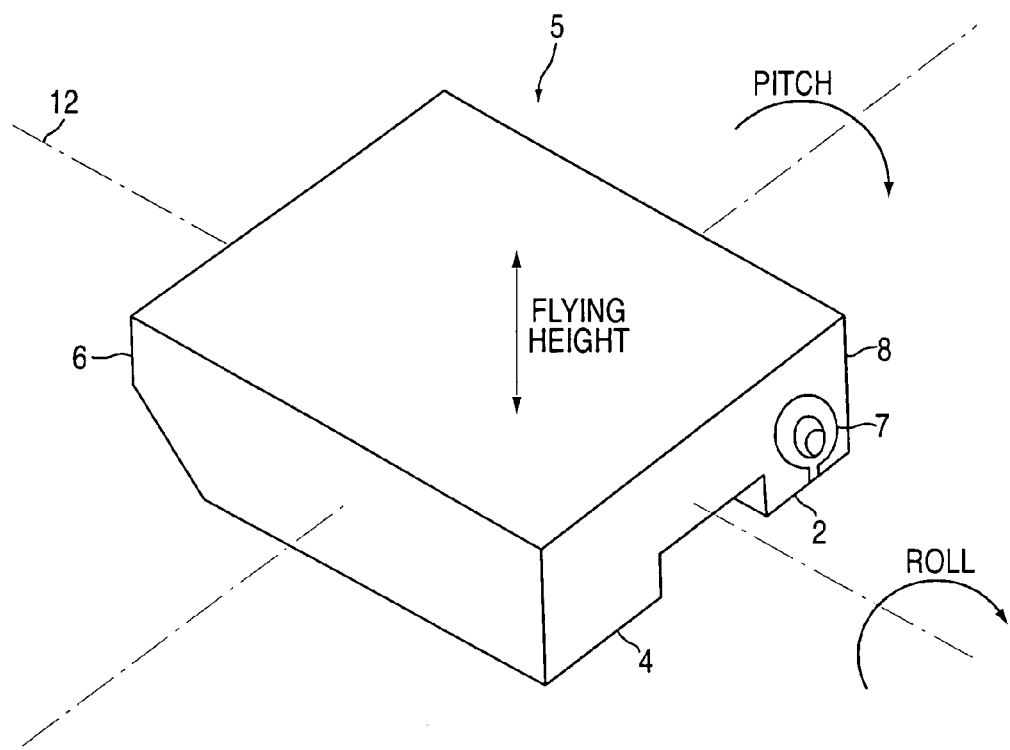
FIG. 1 is a perspective view of a flying slider with a read and write element assembly having a tapered conventional catamaran air bearing slider configuration.
Figure 2:
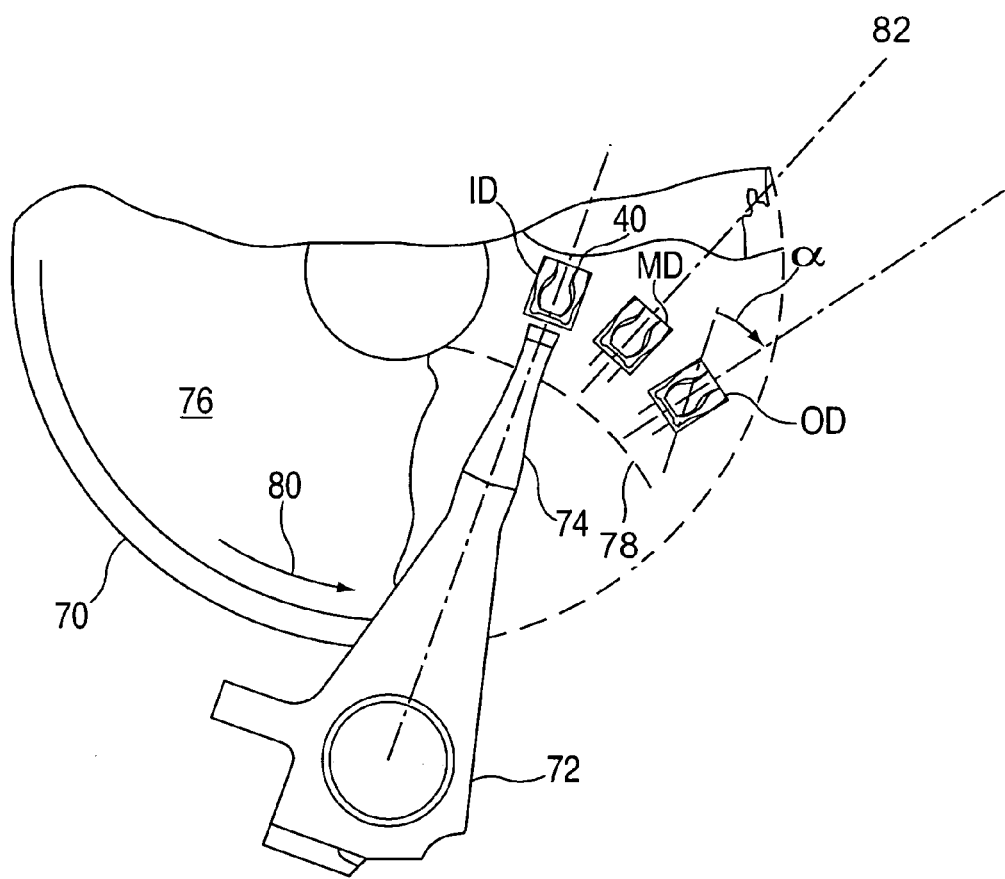
FIG. 2 is a plan view of a mounted air bearing slider over a moving magnetic storage medium.
Figure 3A:
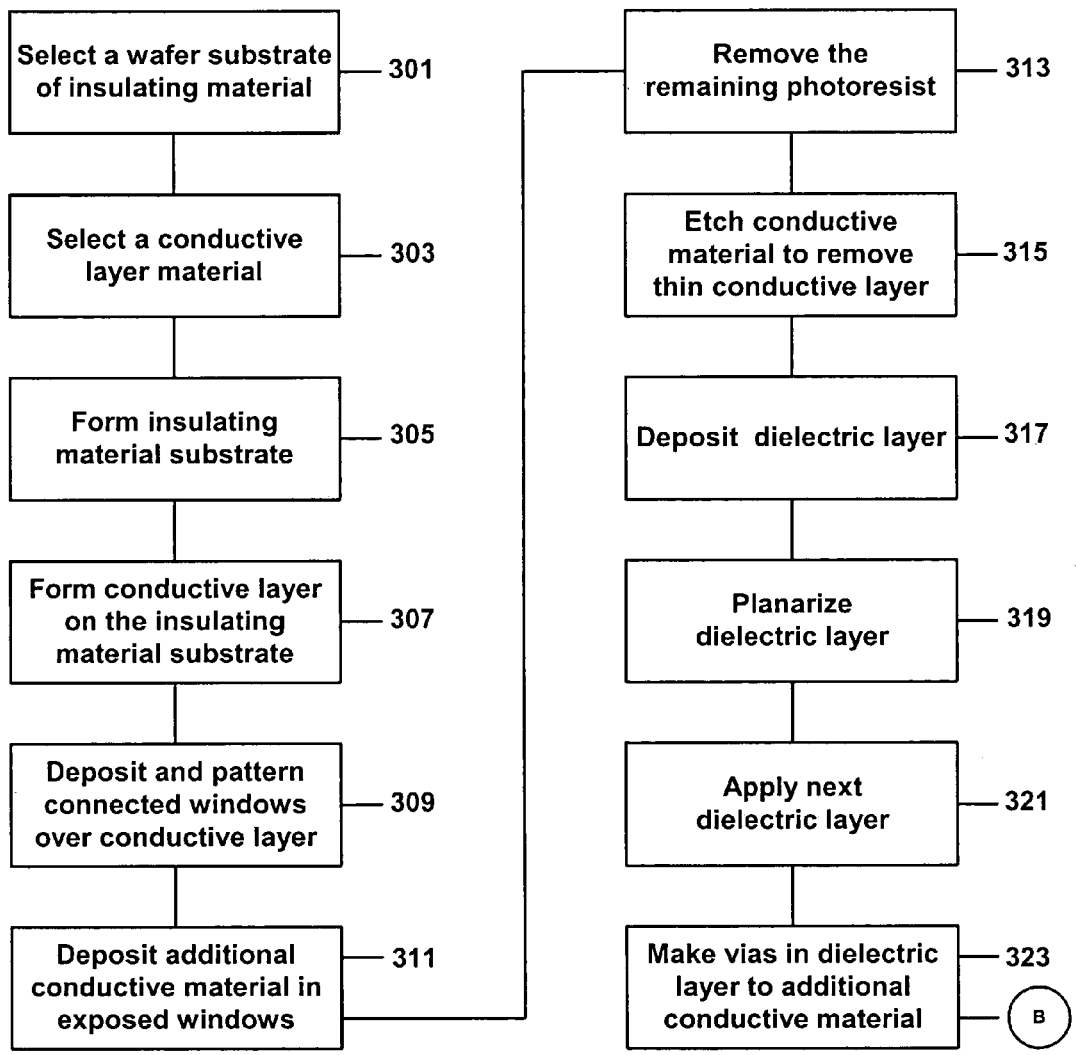
FIGS. 3a–b are a flow diagram of a method of fabricating a portion of a magnetic recording head according to an embodiment of the present invention.
Figure 3B:
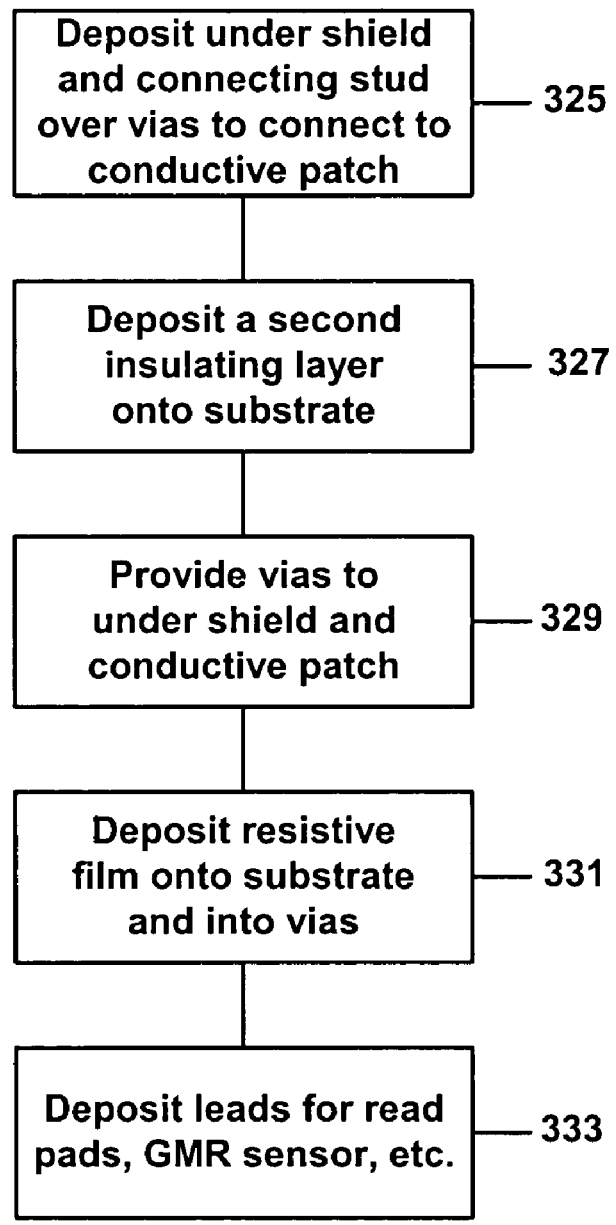

Referring to FIGS. 3a–b, a flow diagram is shown of a method according to an embodiment of the present invention. In block 301, a slider substrate is selected made of an insulating material. As described above, such a substrate tends to have substantially better mechanical properties than sliders made of conductive material. In this embodiment, the material for the slider substrate is selected based on properties such as hardness, machinability, surface finish, thermal conductivity, coefficient of thermal expansion, and porosity. The slider substrate may also be selected for its chemical properties as well. These include corrosion resistance and the level of reactivity with etchants (e.g., for the fabrication processes). In this example, Alumina is selected as the substrate material.

In block 303, a conductive layer to be applied to the insulating-material substrate is selected. In this example, the material used for the conductive layer is selected so that it has a strong bond to the underlying substrate material and is resistant to wear and oxidation. In this example, electrical conductivity and surface resistivity are not important characteristics for the conductive layer. A layer of Tantalum (Ta) has been selected in this embodiment and has a thickness, e.g. of 10 nm.

In block 305, the insulating-material substrate is formed, in this case using known techniques, such as sintering, hot-pressing, etc. In block 307, the conductive layer of Tantalum is applied to the substrate. In this embodiment, after the tantalum layer is applied, the top and bottom surfaces are electrically connected to one another. In this case, when the bottom surface is electrically grounded (e.g., when mounted on a fixture or the like), the top surface is also grounded. With both the top and bottom surfaces including conductive layers, the slider substrate has the ESD characteristics of the $Al_2O_3TiC$ material described above.

In block 309, the top layer of the substrate is covered with photoresist and selectively patterned using any of a variety of known photolithographic processing methods. In this example, a plurality of "windows" will be created over the conductive layer. Each slider die will include one of these windows. The window extends over where the air-bearing surface (ABS) will eventually be created on the die. In this embodiment, the window also extends over an area greater than, and completely containing projections of the read-head shields and write-head poles. Thus, the window provides a flat and uniform foundation on which the read-head shields and write-head poles can be constructed without complication of topographical, optical, or material discontinuities. A dead-end of the window deviates from the ABS area and expands into the slider area to provide a site for a ground-pad as described in further detail below. In this embodiment, the windows are connected to one another, and the collection of windows extends to the edge of the substrate.

Figure 4:
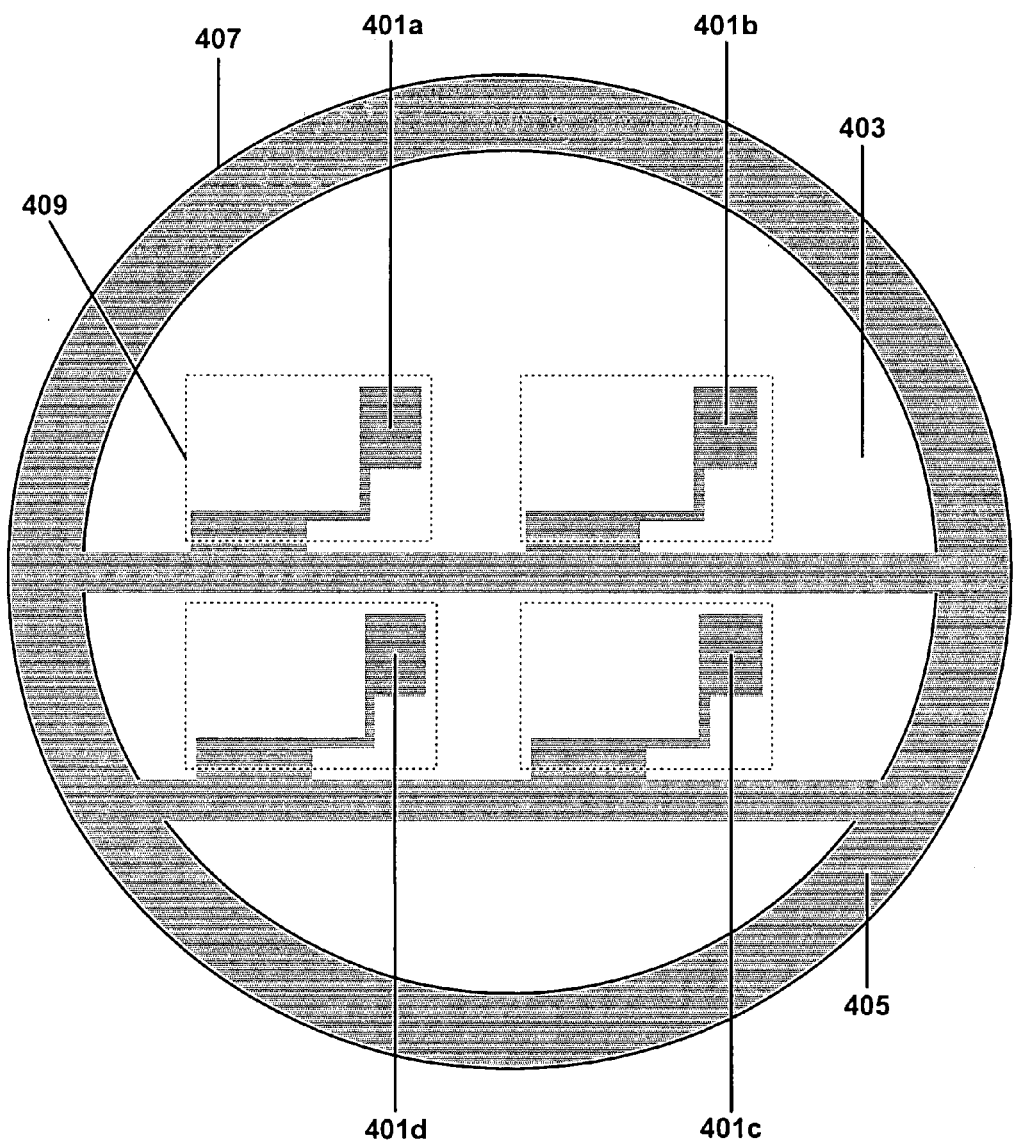
FIG. 4 is a view orthogonal to a substrate of sliders during the fabrication process of FIG. 3.

A schematic representation of this feature is shown in FIG. 4. In FIG. 4, a wafer is provided that includes four slider dies. Each slider die is marked by a dashed line (e.g., element number 409). Each die will include one of the windows 401a–d over it. As shown in FIG. 4, the areas of the windows are connected to each other and connected to the reaches of the substrate 407, where they are electrically coupled to the bottom side of the substrate and can be effectively coupled to ground (e.g., through a fixture). As described above, area 403 refers to the area of the substrate that is covered with a relatively thin layer of conductive material (Tantalum). After the windows 401a–d and connective structures are developed in the photoresist, additional conductive material may be added to these areas (see block 311 in FIG. 3). In this embodiment, the added conductive material has a good adhesion with the conductive layer as well as with a later-applied dielectric layer (e.g., alumina). The added conductive material or "conductive patch" is also selected to be wear and corrosion resistant. In this example Permalloy, with an 80% Nickel and 20% Iron content is selected. The thickness of the added conductive material is set to be greater than the eventual flying height of the slider, preferably greater than ten times the slider fly-height. In this example, this thickness is 0.5 µm. The conductive patch may be formed through a mask and deposition process, for example. Alternatively, after a thin conductive film is formed in the desired areas, the conductive film may be plated to make it thicker to form the conductive patch described herein.

In FIG. 4, each window may be considered as two large patches connected by a narrow strip. These two patches are designated 505a and 505b in FIG. 5. This pattern is selected to minimize the window area, such as to prevent delamination and improve heat conduction. In the first preferred embodiment, patch 505b is made greater than the first shield 515, such as to provide a flat and uniform foundation for the deposition and patterning of first shield 515. However, patch 505b does not need to be greater than shield 515. For high data-rate recording heads, patch 505b may be lower than shield 515 in stripe-height. In other words, patch 505b may not extend as far above the ABS as shield 515 does. This helps to reduce the read-head capacitance. Similarly, in this first embodiment, patch 505a is made greater than the connecting stud 609, which is in turn greater than the ground pad 507. In addition to the advantage that each layer is built upon a flat and uniform foundation, this arrangement is easy to depict and visualize. However, for high data-rate recording heads, patch 505a and stud 609 can both be reduced in size.

Referring back to FIG. 3, in block 313, the remaining photoresist is stripped from the substrate exposing the thin conductive layer. In block 315, the conductive material on the substrate is etched so as to remove the thin conductive layer and reveal the non-conductive material underneath. The etching process is controlled so that thickness of the remaining additional conductive material is an acceptable amount. In block 317, a dielectric layer is uniformly deposited onto the substrate. In this example, the dielectric is alumina. In block 319, the substrate and additional layers are planarized (e.g., using a chemical machining process or CMP). In doing so, the alumina dielectric layer is removed so as to reveal the additional conductive material residing in the windows. In block 321, a second dielectric film is deposited over the substrate (e.g., alumina). The thickness for the second dielectric film is selected so as to ensure insulation, which shall be free of pin-hole and inadvertent arcing during wafer fabrication, and resistant to electrical shorting by metal smear during the slider process. A thickness of 1 µm will be sufficient in many circumstances.

In block 323, two via holes 603a and 603b (see FIG. 5) are created in the second dielectric film (e.g., through a photoresist mask and etch procedure), over the additional conductive material. Via 603a is located above patch 505a so that it can be connected subsequently to a conducting stud 609. Via 603b is located above patch 505b so that it can be connected subsequently to the first shield 515. Note that via 603b is located outside of the slider area 409, so that it is present in the wafer fabrication processes, and will be removed later in slider fabrication. After via holes 603a and 603b are formed, a layer of conductor suitable for the first shield is deposited over the entire wafer surface. The layer establishes electrical contact with patches 505a and 505b through vias 603a and 603b, respectively. The layer is typically of permalloy, approximately 1 µm thick, and is made of approximately 80% Nickel and 20% Iron. The layer is subsequently patterned through standard photolithographic methods to yield a first shield 515 and a connecting stud 609. At this stage of wafer fabrication, both shield 515 and stud 609 are electrically connected to the ground through negligible resistance. In subsequent wafer fabrication processes, the wafer under construction behaves substantially identical to wafers with a conductive substrate. Thus, the remaining wafer processes will be identical to wafers built upon a conductive substrate. For ESD protection throughout the wafer production, back-end assembly, and field operation, the following protection scheme will be implemented: The under-shield will be electrically coupled to the upper-shield, and both shields together will be coupled through a moderate resistance (e.g., 2 kΩ) to each of the two MR/GMR read leads. Also in this example, the under-shield and the upper-shield will be coupled to the grounding pad of the slider though a relatively large resistance (e.g., 20 kΩ). A further description of the creation of the MR/GMR read-head with ESD protective circuits can be found in U.S. patent application Ser. No. 10/213,561, filed on Aug. 8, 2002 now U.S. Pat. No. 6,870,706 and incorporated herein in its entirety. Examples of the ground pad are described in U.S. patent application Ser. No. 10/414,233, filed on Apr. 16, 2003 now U.S. Pat. 7,064,928 and incorporated herein in its entirety. A combination of ESD protective circuit and ground pad is illustrated in FIG. 6. It is a cross-section parallel to the shorter sides of the slider die.

In an alternative embodiment of the present invention, the conductivity of the opposite side of the substrate is modified. In the example above, the entire opposite side of the substrate includes a conductive layer that is easily coupled to ground (e.g., through a fixture). After a row of sliders (or a block of rows) is separated from the substrate, the additional conductive material on the top of the substrate is no longer conductively connected to the bottom conductive surface (In this example, the bottom conductive surface would be the leading-edge of the sliders in the substrate). Because the thickness of the slider is rather large, the risk of arcing directly between the two conductive surfaces of the same slider is negligible. However, the presence of an exposed conductive surface poses significant risk of ESD damage during handling. This is because this conductive surface of one row (or a block of rows) may inadvertently contact the ESD-sensitive MR/GMR read leads on another row (or a block of rows). In one alternative embodiment, the bottom surface of the substrate is partially coated with conductive material so that when the group of sliders is separated from the substrate, the opposite side will have no conductive material. This can be accomplished in a variety of ways. First, prior to applying the conductive layer to the substrate, all but the perimeter of the bottom surface can be covered with a protective mask (e.g., photoresist), that when removed leaves a large area of the bottom surface without the conductive layer. In this example, conductive material will exist at the perimeter of the bottom surface and can be effectively coupled to a grounding fixture as described above. In another alternative embodiment, the conductive layer on the bottom surface may be masked and then etched or oxidized to reduce the area of the conductive layer on the bottom surface to the perimeter. Also, if the bottom surface has been covered with the conductive layer, that layer may be removed with a grinding process prior to separation of the substrate into rows or blocks of sliders.

In the above examples, the GMR sensors will be no longer electrically connected to the bottom conductive surface after the row or block of sliders is separated from the wafer. This leaves the GMR sensors electrically floating. During further processing of this group of sliders, it would be prudent not to directly engage any of the GMR sensors with a conductor. Instead, the ground pad (as further illustrated below) should be engaged first, and properly grounded. The large resistance between the ground pad and the GMR sensor effectively attenuates transient current during the initial engagement, providing a smooth transition for the GMR sensor to reach the ground potential. Therefore, any subsequent engagement of the GMR sensor with a grounded conductor (e.g., a probe pin, a conductive trace to be attached, or a metal tool) will not cause ESD damage.

During head-gimbal assembly, the ground pad is to be electrically connected early in the process, in particular before the GMR pads are coupled to conductors (e.g., conductive traces on the suspension, probe pins, metal tools, etc.). Also, it is preferable if the GMR pads are separated from the ground pad by the write pads. This will prevent the read-pads from arcing to the advancing ground pin, in case the slider substrate is highly charged.

Figure 5:
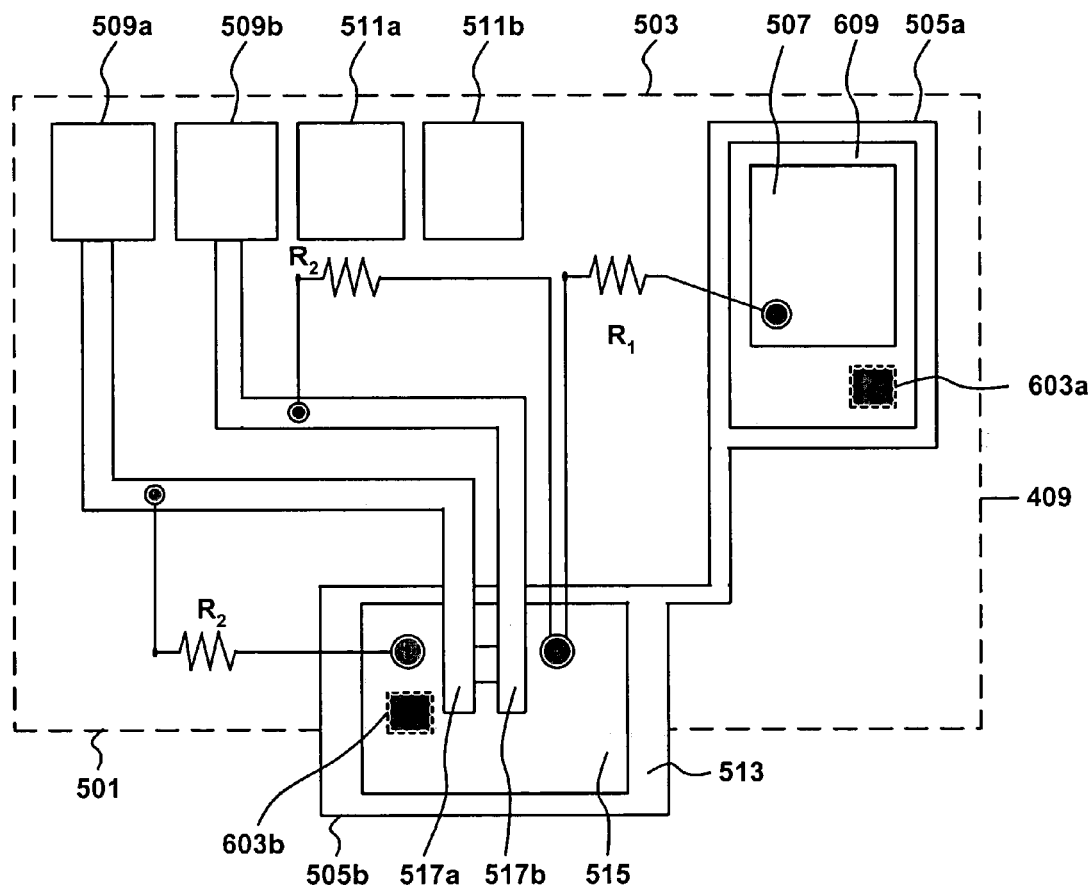
FIG. 5 is a view towards the trailing face of a slider during the fabrication process of FIG. 3.
Figure 6:
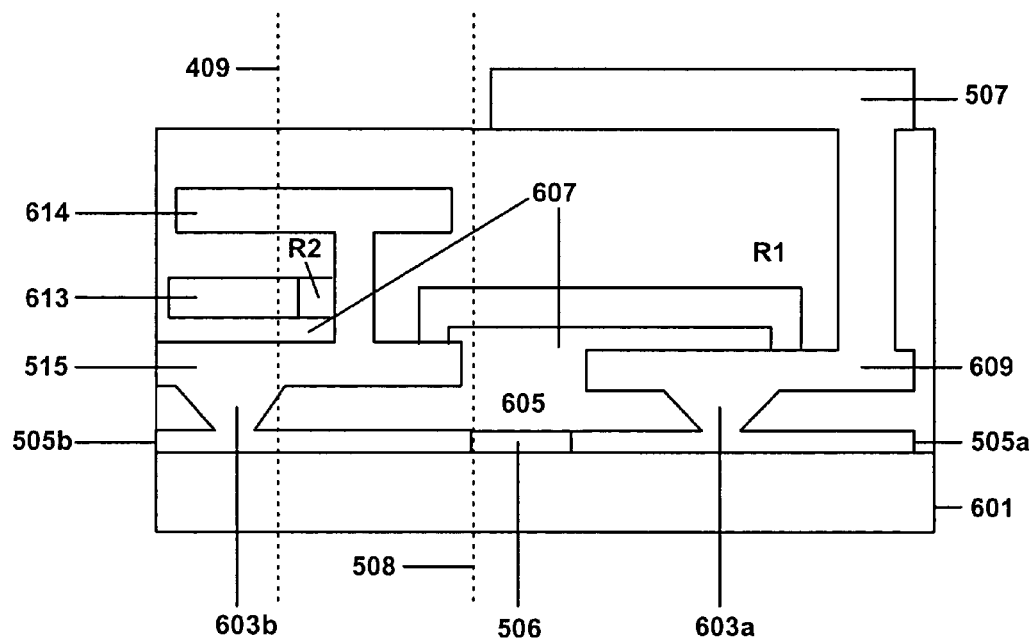
FIG. 6 is a cross-sectional view of the slider of FIG. 5 facing the air bearing surface of the slider.

Referring to FIG. 5, a schematic diagram of the slider and its read write circuitry is shown. As with FIG. 4, the dashed line 409 represents the outline of the slider component. In FIG. 5, the perspective of the slider 409 is the trailing surface. Surface 501 is below this trailing surface and would face the recording medium during operation of a functional slider. Surface 503 faces away from the recording medium and would be connected to a head gimbal assembly for functional operation.

Referring to FIG. 6, a cross section oft. slider from the recording-medium-facing side is shown. In this cross section, the portion to the left of dividing line 508 is to show the first patch 505b and the portion to the right of dividing line 508 is to show the second patch 505a (coupled together with connector 506). As described above, the main substrate 601 is made of an insulating material. After deposition of the additional conductive material or patch 505a,b and a further insulating film 605, vias are made through insulating film 605 to the conductive patch 505. As described above one of the vias (element 603a) is to connect the conductive patch 505a to the ground pad 507 (via connecting stud 609) and the other via (element 603b) is to connect the conductive patch 505b to the under-shield 515. The vias provide an opening for deposition of conductive material and may be manufactured in any of a variety of ways known in the art. Once the vias are in place, the under-shield 515 and connecting stud 609 are funned on top of them (e.g., through a mask and deposition process)(see block 325 in FIG. 3b). In this embodiment, the under shield and the connecting stud are formed in a manner similar to the conductive patch 505a,b as described above.

Another insulating film 607 (e.g., having a thickness in the order of 20 nm) is deposited over the under-shield 515 and connecting stud 609 (see block 327 in FIG. 3b). Next, additional vias are generated in the insulating film 607; one over the under shield 515 and the other over the connecting stud 609 (see block 329 in FIG. 3b). A magneto-resistive film 613, which may be either MR or GMR and typically includes a stack of multiple layers known in the art of magnetic recording (e.g. a seed-layer, a free layer, a conductive nonmagnetic layer, a pin layer, an anti-parallel coupling layer, an exchange layer, and a capping layer) is deposited on the insulating film 607 and into the vias (e.g. element 617) therein (see block 331 in FIG. 3b). A pair of leads for the GMR sensor (see FIG. 5) is formed and electrically coupled to the magneto-resistive film 613, thus defining the read-width of GMR sensor. Leads may be constructed by a variety of methods. The most frequently used methods include first removing the magneto-resistive film 613 in areas the leads will occupy, then depositing the leads in the vacant area, forming a pair of "abutted junctions" with the magneto-resistive film 613. The second most frequently method is to deposit the lead material directly onto the magneto-resistive film 613, forming a pair of "lead overlays." Next the magneto-resistive film 613 is patterned to define the height of GMR sensor, and to define three resistive strips, two for resistors $R_2$, and one for resistor R1. As indicated by FIG. 5, two resistors $R_2$ form a balanced half-bridge with the GMR sensor. The center of this half-bridge is coupled directly to the under-shield 515. Each leg of the half-bridge is of modest resistance, approximately 2 k$\Omega$. A larger resistor $R_1$, in the order of 20 k$\Omega$ or greater, couples the under-shield 515 to the connecting stud 609 (see block 333 in FIG. 3b). As shown in FIGS. 5 and 6, the resistive film is disposed so as provide a resistance (e.g., $R_2$ is approximately 2 k$\Omega$) between the leads of the GMR sensor and the under-shield. The resistive film also provides a resistance (e.g., $R_1$ is approximately 200 k$\Omega$) between the grounding pad 507 and the under-shield. In this embodiment, the dimensions of the resistive film can be patterned during the same operation steps as the patterning of the GMR sensor. In the final configuration, the under-shield will be conductively coupled to the over-shield 614 placed over the GMR sensor and further insulating material is deposited in a known manner on top of the over-shield and other components as shown in FIG. 6.

Referring back to FIG. 5, the two portions of the conductive patch are shown as elements 505a and 505b. The first section 505a of the conductive patch is coupled to a ground pad 507 on the trailing edge face of the slider through vias and the connecting stud 609 (FIG. 6). The second section 505b shows the conductive material with a layer of insulating film on top of it (element 513). Also shown is the under-shield with a thin film of insulating material on top of it (element 515). Furthermore, the leads 517a, 517b for the read pads 509a–b, are shown deposited adjacent to the GMR sensor and over the under shield.

As seen from FIGS. 5 and 6, once the slider has been fabricated, the conductive patch material is closer to the leading edge of the slider than the GMR sensor is. Accordingly, during operation of the slider, debris that has been charged (e.g., triboelectrically charged) to a dangerous level, will arrive at the conductive patch first, then move toward the GMR sensor. This facilitates discharging debris before it can interact, and potentially damage, the other circuitry of the slider, especially the GMR sensor.

In manufacturing the slider according to FIGS. 5 and 6, it may be beneficial if the high-resistance (i.e., $R_1$) connection between the GMR sensor and the ground pad 507 is routed away from the conductive patch This minimizes stray capacitance and hence the delay in the propagation of ESD transients, and minimizes the probability of any short-circuits due to any imperfections in the insulating layer 607 that may occur. Using the insulating slider substrate of the present invention, the slider body should not charge to a dangerous potential as long as the disk surface is adequately conductive and the fly-height of the slider is stable. Additional protection from tribocharge potentials can be provided by coating the slider air bearing surfaces with a conductive film such as a high-conductivity carbon overcoat. It is noted that a conductive disk surface is more reliable than a conductive slider ABS since wear is distributed over a larger area. The critical sheet-resistivity of the disk surface is inversely proportional to the linear speed of the slider-disk motion. Desirably, the disk surface resistivity is on the order of 30 kΩ/square or less.

Figure 7:
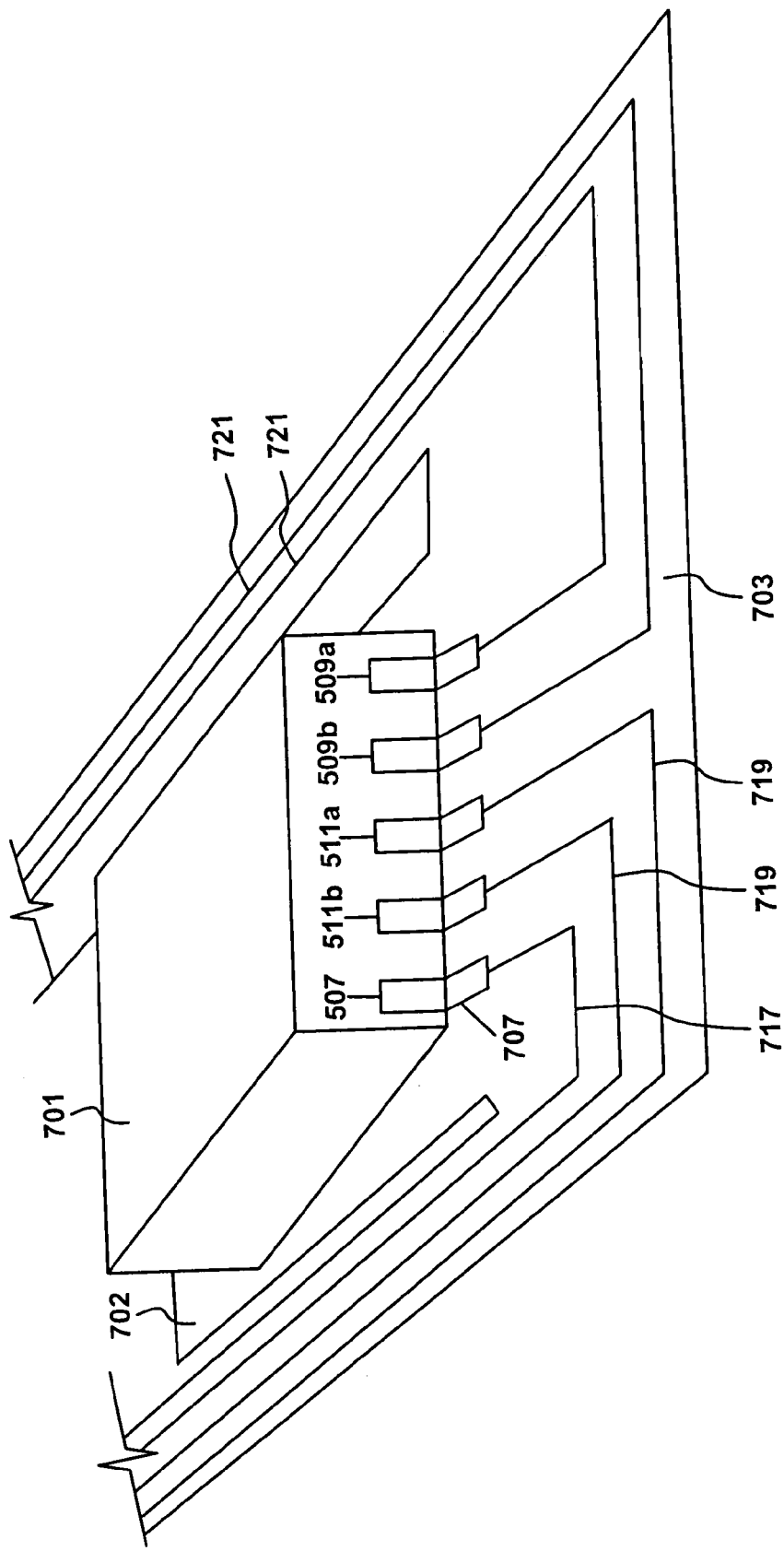
FIG. 7 is an example of a system for connecting the ground pad of the sliders of FIGS. 5 and 6 to a suspension according to an embodiment of the present invention.

Referring to FIG. 7, an example of an assembly for connecting the ground pad is shown. In FIG. 7, the slider 701 is coupled to the tongue 702 of a suspension 703. The grounding pad 507 is conductively connected to pad 707 of the suspension (e.g., through gold ball bonding). Trace 717 on the suspension can be coupled to an appropriate ground in the disk drive. The write pads 511a–b of the slider 701 are conductively coupled to corresponding pads on the suspension. The read pads 509a–b are also conductively coupled to corresponding pads on the suspension. The write pads 511a–b are connected to the write circuitry of the drive via traces 719 and the read pads 509a–b are connected to the read circuitry of the drive via traces 721. Other methods are available for providing a ground connection to ground pad 507. For example, the suspension 703 can be a laminated structure including a dedicated, embedded conductor that is connected to an appropriate ground in the drive as well as pad 707. Further descriptions of the connecting of a ground pad for the slider to ground may be found in U.S. patent application Ser. No. 10/414,233, filed on Apr. 16, 2003 and incorporated herein in its entirety.

While the present invention has been described with reference to the aforementioned applications, this description of the preferred embodiments is not meant to be construed in a limiting sense. It shall be understood that all aspects of the present invention are not limited to the specific depictions, configurations or dimensions set forth herein which depend upon a variety of principles and variables. Various modifications in form and detail of the disclosed apparatus, as well as other variations of the present invention, will be apparent to a person skilled in the art upon reference to the present disclosure. It is therefore contemplated that the appended claims shall cover any such modifications or variations of the described embodiments as falling within the true spirit and scope of the present invention.

For example, though the slider substrate described above is made of alumina, other materials may be used including those that are better electrical conductors. In some settings, it may be beneficial to dope the insulating substrate so as to increase the conductivity thereof.

What is claimed is:

1. A read head for a magnetic recording device comprising:
    a substrate made of an electrically insulating material;
    a conductive film disposed on said substrate;
    a first insulating film disposed and planarized over said conductive film;
    an under-shield disposed over said first insulating film and a portion of said conductive film;
    a second insulating film disposed over said under-shield; and
    read-head circuitry disposed on said second insulating film and over said conductive film wherein said read head includes two leads, and said read head further comprising two resistive stripes each conductively coupling said under-shield to one of said two leads; and
    a grounding pad disposed on said second insulating film and conductively coupled to said conductive film.

2. The read head of claim 1 wherein a resistance of said resistive stripes is approximately 2 kΩ.

3. The read head of claim 1 wherein said resistive film is further conductively coupling said under-shield to said grounding pad and has a resistance of approximately 200 kΩ.

4. A method of fabricating a read head for a magnetic recording device, comprising:
    applying a conductive layer to top and bottom surfaces of a substrate made of an electrically insulating material;
    disposing a conductive patch material on the top surface of the conductive layer on said substrate; and
    disposing read-head circuitry over a portion of said conductive patch material.

5. The method of claim 4 wherein said read-head circuitry is giant magnetoresistive circuitry, the method further comprising:
    disposing an under-shield between said conductive patch material and said read-head circuitry.

6. The method of claim 5 wherein said substrate is made of alumina.

7. A method of fabricating a read head for a magnetic recording device, comprising:
    applying a conductive layer to top and bottom surfaces of a substrate made of an electrically insulating material;
    disposing a conductive patch material on the top surface of the conductive layer on said substrate;
    disposing an under-shield over a portion of said conductive patch material; and
    disposing giant magnetoresistive read-head circuitry over said under-shield.

8. The method of claim 7, further comprising:
    disposing a ground pad over a portion of said conductive patch material, said ground pad being conductively coupled to said conductive patch material.

9. The method of claim 8, further comprising:
    disposing an insulating film over said under-shield;
    providing at least one via through said insulating film to expose said under-shield;
    disposing leads for said read-head on said insulating film; and
    disposing a resistive film on said insulating film so as to conductively couple said under-shield to the leads of said read-head.

10. The method of claim 9, wherein said resistive film conductively couples said under-shield to said ground pad.

11. The method of claim 10, wherein said resistive film between the under-shield and the leads of the read-head is approximately 2 kΩ.

12. A method of fabricating read heads for a magnetic recording device, comprising:
    disposing a conductive patch material on a wafer made of an electrically insulating material for a plurality of read heads, such that said conductive patch material for each of said read heads is conductively coupled together on a top surface of said wafer;
    disposing an under-shield over a portion of said conductive patch material for each read head; and
    disposing giant magnetoresistive read-head circuitry over said under-shield for each read head.

13. The method of claim 12 wherein in said disposing a conductive patch material operation, conductive material is disposed on a bottom and side surface of said wafer such that conductive material on the bottom and side surface of said wafer is conductively coupled to the conductive patch material on the top surface of the wafer.

14. The method of claim 13 further comprising:
removing said conductive material from the bottom surface of said wafer except for a periphery of said bottom surface of said wafer.

15. The method of claim 13 wherein said conductive material is only disposed at a periphery of the bottom surface of said wafer.

16. A head suspension assembly comprising:
a read head including
  a substrate made of an electrically insulating material;
  a conductive film disposed on said substrate;
  a first insulating film disposed and planarized over said conductive film;
  an under-shield disposed over said first insulating film and a portion of said conductive film;
  a second insulating film disposed and planarized over said under-shield;
and
  read-head circuitry disposed on said second insulating film and over said conductive film wherein said read head includes two leads, and said read head further comprising two resistive strives each conductively coupling said under-shield to one of said two leads; and
  a grounding pad disposed on said second insulating film and conductively coupled to said conductive film; and
a suspension including a conductive path coupled to said grounding pad.

* * * * *

UNITED STATES PATENT AND TRADEMARK OFFICE
CERTIFICATE OF CORRECTION

PATENT NO.       : 7,239,488 B2                                    Page 1 of 1
APPLICATION NO.  : 10/797653
DATED            : July 3, 2007
INVENTOR(S)      : Li-Yan Zhu et al.

It is certified that error appears in the above-identified patent and that said Letters Patent is hereby corrected as shown below:

| Column | Line | |
|--------|------|---|
| 2 | 54 | After "thresholds" insert --that--. |
| 3 | 25 | Change "for an head/slider" to --for a head/slider--. |
| 6 | 26 | Change "Aug. 8, 2002" to --Aug. 7, 2002--. |
| 6 | 30 | After "Pat." insert --No.--. |
| 7 | 35 | Change "oft." to --of the--. |
| 7 | 52 | Change "funned" to --formed--. |
| 8 | 11 | After "frequently" insert --used--. |
| 8 | 23 | Before "provide" insert --to--. |
| 12 | 17 | Change "strives" to --stripes--. |

Signed and Sealed this

Eighteenth Day of March, 2008

JON W. DUDAS
*Director of the United States Patent and Trademark Office*